Patented Apr. 29, 1941

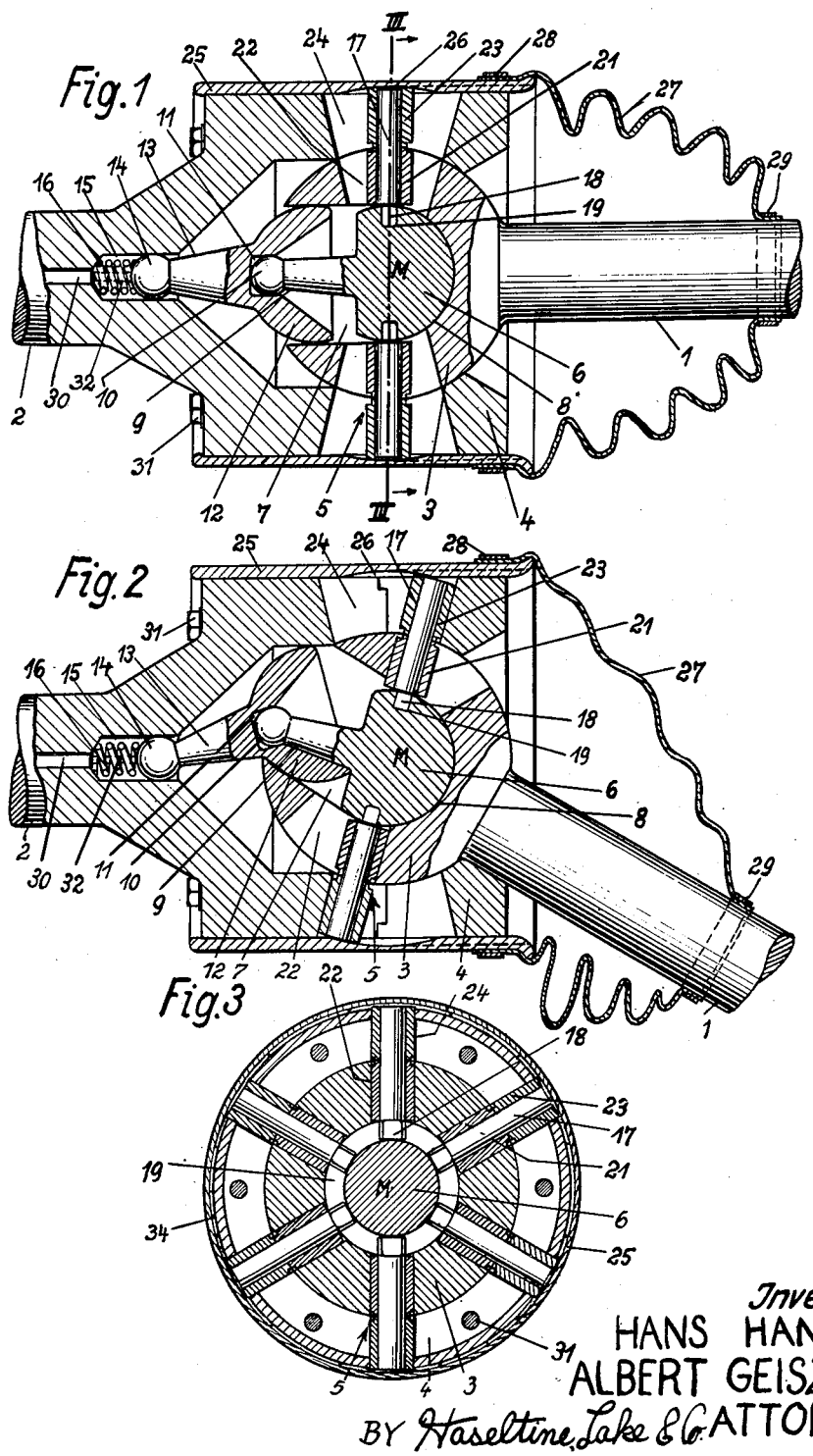

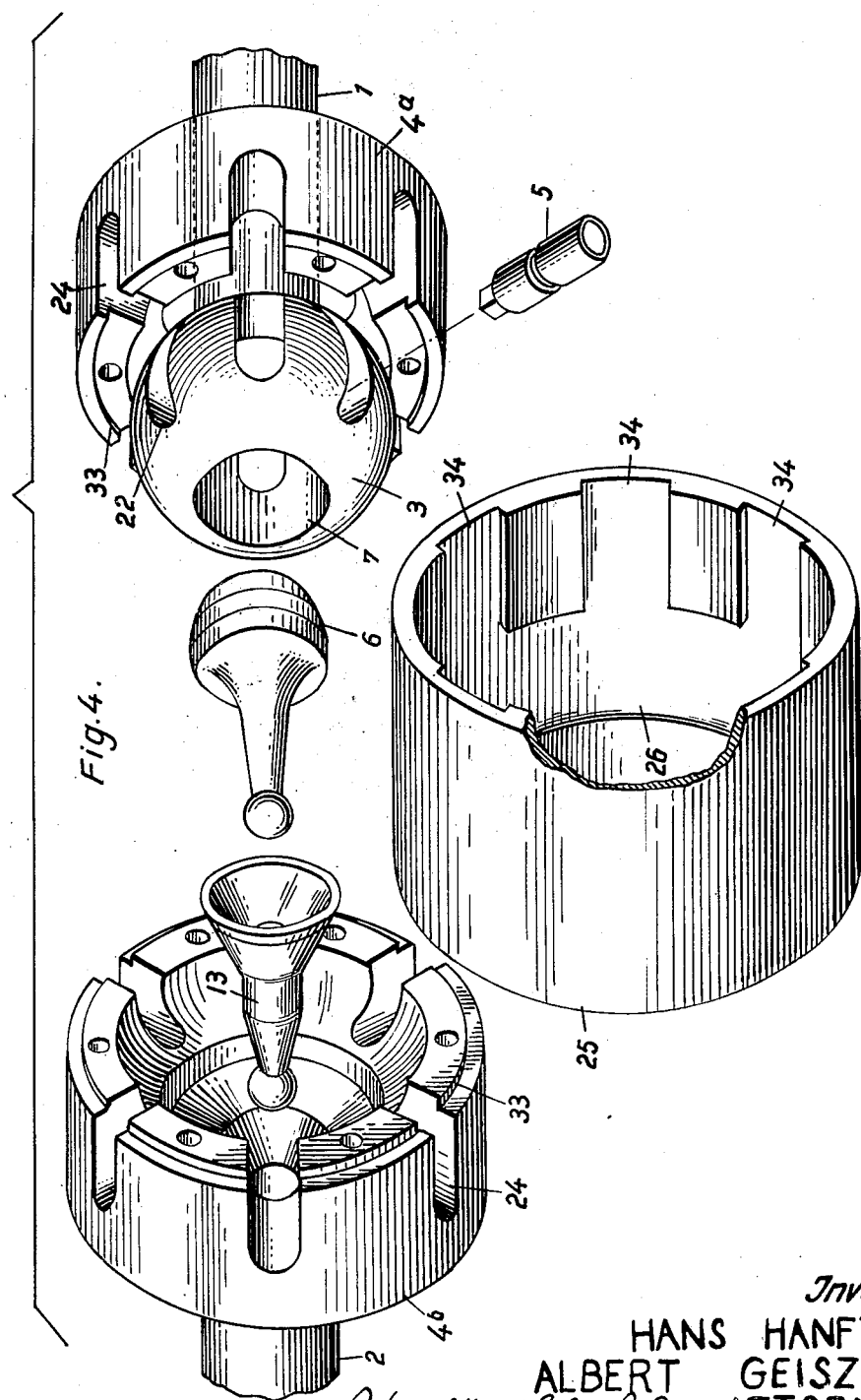

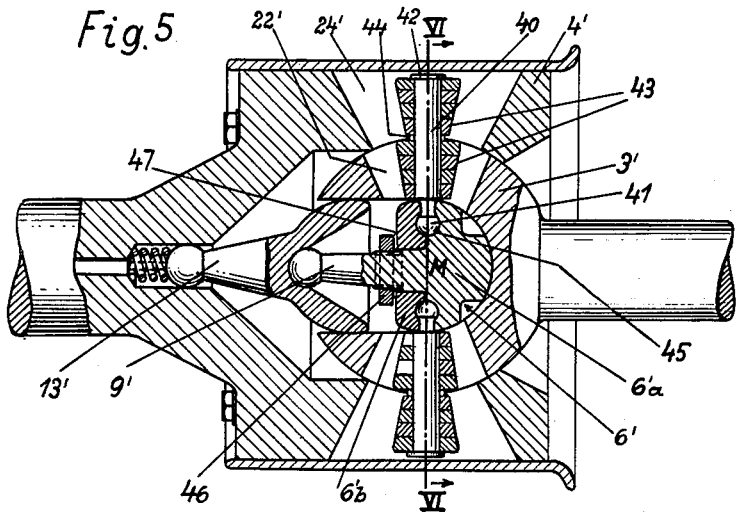
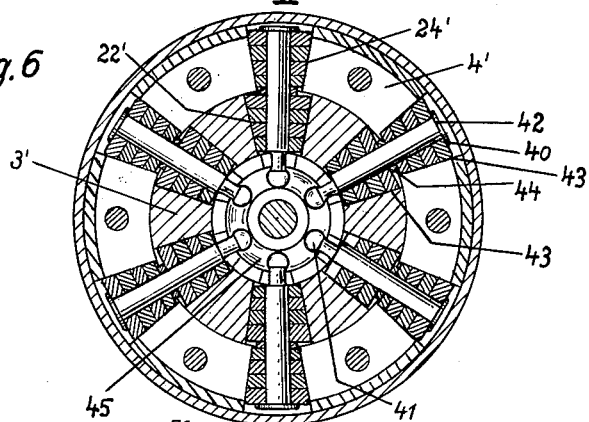
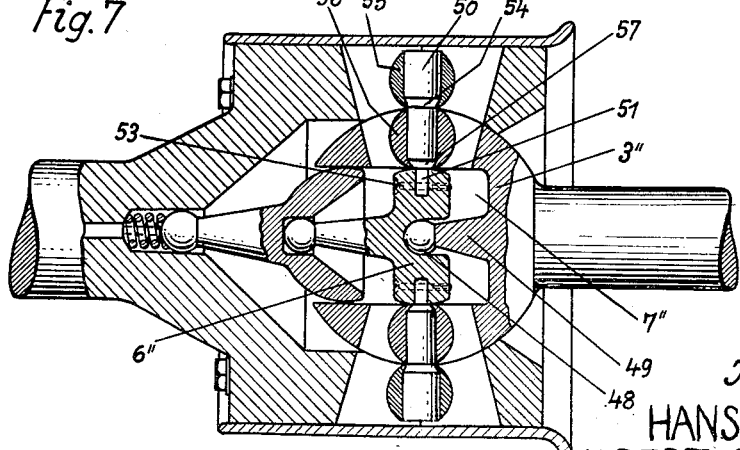

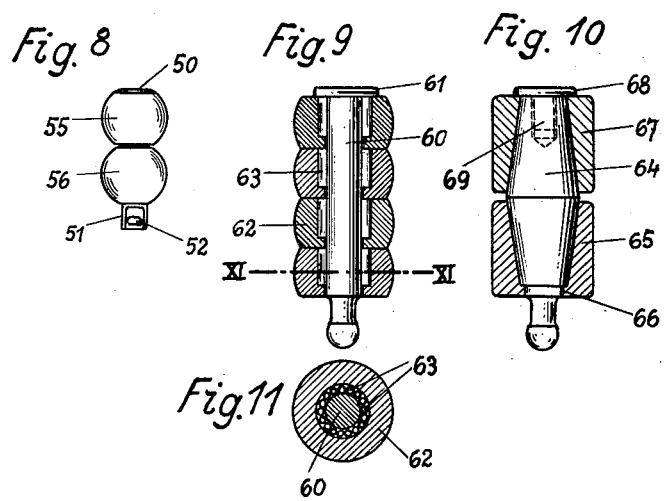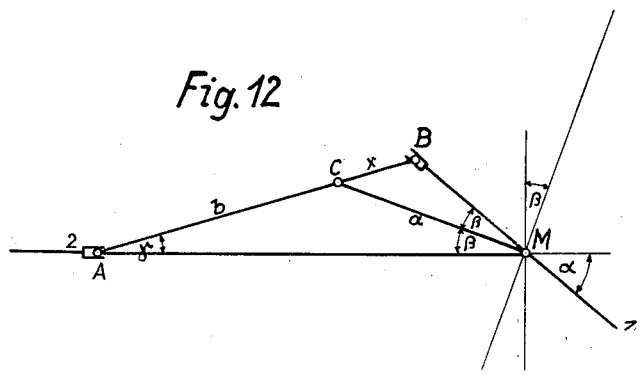

2,239,675

UNITED STATES PATENT OFFICE 2,239,675

JOINT FOR THE CONNECTION OF SHAFTS

Hans Hanft, Munich, and Albert Geiszler, Suhl, Germany; said Geiszler assignor to Berlin-Suhler Waffen-Und Fahrzeugwerke G. m. b. H., Suhl, Germany, a corporation of Germany Application June 4, 1938, Serial No. 211,936
In Germany June 9, 1937

8 Claims. (Cl. 64—21)

This invention relates to joints for connecting two rotating shafts or shaft parts which are relatively swivelled as, for example, for vehicles, especially automotive vehicles, machines, measuring instruments etc.

It is an object of the invention to provide a universal joint which will enable the two coupled shafts to rotate at substantially identical speed and also at great angular swivelling movements, that is to say without the occurrence of perceptible retarding or advancing action in the number of revolutions of the two shafts, and which while being very compactly designed will work with minimum loss of energy and without the occurrence of seizure or jamming between the various parts of the joint.

A universal joint for shafts is known in which a spherical head connected to one shaft is encased by a ball socket connected to the other shaft, the head being coupled to the socket by means of drivers in the form of balls held in a special ball race located between the head and the socket, the position of the said ball race being controlled according to the angle of displacement of the shafts by means of a spring-loaded controlling member in the form of a rod provided with spherical ends of which one is mounted in a recess in one shaft and the other in a recess in the other shaft, said member also movably meshing at an intermediate point with the ball race for guiding the driving balls.

This known joint is practically useless for connecting shafts which are to be relatively swivelled through comparatively large angles, as the driving balls which are held in meridian grooves in the head and socket may seize or jam even if the angle of relative displacement is comparatively small.

The joint according to the invention provides for angles of relative displacement of up to 40 degrees between the two coupled shafts and for their rotating at substantially identical speeds and without seizure or jamming of any kind occurring.

According to the invention the power transmitting means or drivers are located in slots passing through both the spherical head and the ball socket and moved by means of a guide member arranged in the interior of the head, so that the spherical surface of the socket and of the spherical head are in close contact. The drivers are held in the guide member substantially in a common plane and are so designed and arranged that they are adapted to slightly move or shift in the said plane. Further the surface parts of each driver are adapted to rotate independently of one another during the operation.

Other parts and details of the invention are to be taken from the following detailed specification.

Some constructional forms of the joint according to the invention are illustrated by way of example in the accompanying drawings in which Figure 1 is a longitudinal section through one embodiment of a joint, the parts being shown in the position they occupy when the two coupled shafts are not relatively swivelled, i. e. when they are axially aligned;

Figure 2 is a longitudinal section similar to that in Figure 1 in which, however, the two shafts are shown axially displaced with respect to one another.

Figure 3 is a cross section through the joint on the line III—III of Figure 1;

Figure 4 is a disassembled perspective view of the individual parts of the embodiment illustrated in Figures 1—3;

Figure 5 is a longitudinal section corresponding to Figure 1 through a modified embodiment of the joint;

Figure 6 is a cross section through this embodiment on the line VI—VI of Figure 5;

Figure 7 is a longitudinal section through a further embodiment;

Figure 8 is a side view of one of the drivers used in the embodiment illustrated in Figure 7;

Figures 9 and 10 are longitudinal sectional views of two further embodiments of the drivers;

Figure 11 is a cross section through the driver on the line XI—XI of Figure 9; and Figure 12 is a diagram explaining how the constructional dimensions of the member for controlling the driver guide member are determined.

In the embodiment illustrated in Figures 1—3, a spherical head 3 connected to one shaft 1 is encased in a bowl-shaped ball socket 4 connected to the other shaft 2 in such a way that their spherical surfaces are in contact without any space between them. The power is transmitted from one shaft to the other by means of multipartite driving members 5 which extend through slots in the spherical socket 4 and the spherical head 3 and are held by means of a guide member 6 arranged within a recess 7 in the spherical head 3. In this embodiment six drivers are provided; the number required depends upon the size of the joint and the order of magnitude of the power to be transmitted, i. e. there may be any number of drivers, e. g. an even number:

two, four, six or more, or an odd number: three, five, seven or more.

The member 6 for guiding the drivers 5 forms substantially a sphere which is free to bear on one side against a bowl-shaped spherical supporting surface 8 at the end of the cylindrical recess 7 in the spherical head 3. On the opposite or free side the guide member 6 possesses a pin-shaped extension 9 the free end 10 of which is of spherical shape. This spherical end 10 engages in a cylindrical recess 11 in a spherical end 12 formed with a flared opening, of a controlling member 13, which controls the position of the guide member 6 and thus also the position of the drivers 5 in such dependency upon the angle of displacement between the two shafts 1 and 2 that the plane (plane of symmetry) which passes through the centres of all the drivers and through the centre point M of the joint and, when the shafts are axially aligned, is at right angles to their axes, moves during displacement of the shafts exactly or approximately exactly by half of the angle of displacement between the two shafts as hereinafter explained in further detail.

The controlling member 13 is mounted with its spherical end 12, which is hollowed out in the form of a funnel, in the cylindrical recess 7 of the spherical head 3, in which is also arranged the member 6 for guiding the drivers. The controlling member 13 which is otherwise in the shape of a rod carries at its other end a ball 14, which is disposed within a cylindrical bore 15 in the shaft 2.

A spring 16 is inserted between the ball 14 of the controlling member 13 and the end wall of the cylindrical bore 15 in the shaft 2, and serves the purpose of pressing the guide member 6 against the bearing surface 8 in the recess 7 in the spherical head by means of the controlling member 13 which moves the guide member 6, so that the centre point of the spherical guide member 6 coincides in all positions with the centre point M of the entire joint system. On the other hand the spring 16 also serves the purpose of compensating for variations in the length of the path between the centre of the guide member 6 and the centre of the ball 14 of the controlling member 13, due to the displacement of the shafts.

The drivers 5 are arranged to form a star and are held substantially in the guide member in a common plane in such a manner that they are slightly movable or shiftable in the guide member in the said plane but cannot move transversely of the said plane.

In the embodiment illustrated the drivers 5 consist of a core and several outer parts which are movable in relation to the core and to one another. The driver cores are formed by cylindical pins 17 the flattened inner ends 18 of which are so held in a peripheral groove 19 provided in the guide member 6 that they can be slightly displaced in the direction of the longitudinal axis of the groove but not transversely of the groove.

Cylindrical rollers are rotatably mounted above one another upon the pin 17, of which the internal rollers 21 co-operate with the parallel side walls of a slot 22 in the spherical head 3, and the external rollers 23 co-operate with the parallel side walls of a slot 24 in the bowl-shaped socket 4.

On the outside of the spherical socket 4 there is attached a sleeve 25 which closes the slot in the spherical socket on the outside and at the same time acts as a counter-bearing for the driver pin 17 which is only loosely held in the guide member 6, and for the rollers 21 and 23; on the inside the said sleeve is therefore provided with a peripherally extending curved groove 26.

The open side of the joint is closed by means of a jacket 27 of leather or the like which is firmly attached to the sleeve 25 by means of a clip 28 and to the shaft 1 by means of a clip 29. In this way the entire inner space of the joint which is filled with lubricant is protected against dirt and loss of lubricant. The lubricant can, for example, be supplied and replenished through an axial bore 30 provided in the shaft 2, and communicating with the bore 15, the latter possessing one or more small longitudinal grooves 32, so that the lubricant can easily pass around the spherical end 14.

The embodiment of the invention hereinbefore described is very compact and simple and allows of very easy assembling and dismantling of the joint.

The assembling may for instance be effected in the following manner (see Figure 4): One of the annular halves 4a of the bowl-shaped socket is pushed over the spherical head 3 attached to the shaft 1 and in the recess 7 of which the guide member 6 is inserted. The second half 4b of the ball socket, which is attached to the shaft 2 and in which the controlling member 6 is inserted, is then placed over the spherical head 3 from the opposite side. The two halves 4a and 4b of the ball socket are fitted together by means of recessed rims 33 (it is assumed here that the plane of the dividing line passes substantially through the centre of the slot 24). After the two halves of the ball socket 4a and 4b have been firmly secured together for example by means of bolts 31, and the two shafts 1 and 2 have been co-axially aligned, the drivers 5 are inserted from the outside through the slots 24 and 22. The sleeve 25 is then mounted in the manner of a bayonet cap, that is to say the sleeve is first displaced axially along the shaft 2, the ends of the drivers 5 projecting from the surface of the ball socket engaging in the internal grooves 34 which extend axially from the rim of the sleeve to the peripheral internal groove 20, whereupon the sleeve is rotated until the drivers reach symmetrically curved portions of the groove 26, and are finally attached to the ball socket. Instead of a sleeve made in one piece, a sleeve formed in two parts could be used, the dividing line being along the centre of the groove 26, so that the two parts can be pushed on to the ball socket from opposite sides.

While in the embodiment illustrated in Figures 1–3 the driver pins and the parts movably mounted thereon bear against the curved internal surface 26 of the external covering sleeve 25 when in operation, it can alternatively be so designed and arranged as to have no contact at all with the sleeve 25. In the following embodiments the drivers are supported at the inner ends in the guide member and the parts movably arranged upon them are supported by the pin against movement in the outward direction. In these embodiments the driver parts cannot as in the case of the embodiment illustrated in Figures 1–4 be inserted from outside into the already assembled spherical head and ball socket parts, but must be placed in position before the second half of the ball socket on the shaft 2 is joined to the other half of the ball socket.

In the form of embodiment illustrated in Figures 5 and 6 the drivers each consist of a cylindrical pin 40, possessing at the inner end a ball 41 and at the outer end a collar 42, against which latter bear the movable parts being in the form of bevelled washers 43 rotatably mounted on the pin. The bevelled washers 43 are provided in two sets of four washers each, an ordinary small washer 44 being interposed between the two sets, the latter being so assembled as to form two inwardly directed truncated cones each consisting of four layers. The set bearing against the collar 42 co-operates with the side walls of the slot 24' in the ball socket 4' and the other set cooperates with the slots 22' in the spherical head 3', the side walls of the slots 22' and 24' tapering inwardly to correspond with the conical shape of the sets of washers on the driver pin.

The pins 40 of these drivers have their spherical ends 41 encased in a groove 45 of circular cross section in the guide member 6', which, in order to enable the spherical ends 41 of the driver pins to be inserted in the annular groove 45, is composed of two parts, namely, a part 6'a, having a cross-shaped cross section, integral with a pin-shaped extension 9' for the controlling member 13', and an annular part 6'b which, by the aid of the nut 46, which can be screwed onto the extension 9', and the interposition of a washer and locking washer 47, can be attached to the part 6'a. One half of the annular groove 45 for the spherical ends 41 of the driver pins 40 is located in the part 6'a and the other half in the part 6'b.

In the form of embodiment illustrated in Figure 7 the member for guiding the drivers is in the form of a swash plate 6'' which is mounted about a ball 48 on the end of a pin-shaped extension 49 projecting from the bottom of a cylindrical recess 7'' in a spherical head 3'' so as to be rotatably held around the centre M of the system.

The driver pins 50 are secured against movement in the outward direction in the guide member 6'', the inner end 51 of each pin 50 being flattened and, as in the case of the embodiment illustrated in Figures 1–3, engaging in a peripheral groove in the guide member, while being further provided with a longitudinal hole 52 (see Figure 8) through which a retaining pin 53 can be passed, the latter being secured to the guide member 6''.

Each driver pin 50 possesses two cylindrical surfaces having differing diameters, and being connected by means of a narrow, slightly conical shoulder 54. Two balls 55 and 56 having correspondingly differing internal bores are arranged upon the pin, of which the outer ball 55 is secured against movement in the outward direction, the internal end of its bore being tapered so that the said end can bear against the shoulder 54. The inner ball 56 is in the same manner as the outer sphere bearing against a slightly conical shoulder 57 on the pin 50, so as not to come into contact with the outer ball 55.

As regards the design of the multipartite drivers there are numerous other possibilities of embodiment, and two further examples are illustrated in Figures 9–11.

The driver illustrated in Figure 9 possesses a cylindrical pin 60 with a collar 61 at its outer end, the inner end being flattened and provided with a longitudinal hole or designed to incorporate a ball, so that the said end can be held in the guide member in the above described manner. Four barrel-shaped members 62 are mounted on the pin 60 on needle bearings. The members 62 are for this purpose cylindrically recessed in an axial direction so as to provide an annular space open towards one end for the accommodation of needles 63, arranged side by side with their axes parallel to the axis of the pin 60, as shown in Figure 11. Of the roller members 62 mounted on the needles 63 the outer two co-operate with the slot in the ball socket and the inner two with the slot in the spherical head.

The driver illustrated in Figure 10 possesses a pin 64 of barrel or double-cone shape, which endows it with greater resistance to the forces arising during operation. Two cylindrical rollers 65 and 67 are mounted on the driver pin 64, of which the inner roller 65 is secured against movement in the outward direction by being provided with a narrow surface of a rim projecting from the internal conical bore and bearing against a shoulder 66 of the pin 64. The outer roller 67 is secured against movement in the outward direction by reason of a small part of its surface bearing against a plate 68 which can be attached to the free end of the pin 64 by means of a grub screw 69. The inner roller 65 co-operates with the slot in the spherical head and the outer roller with the slot in the ball socket.

For the purpose of further decreasing the friction losses the multipartite drivers described in the various embodiments above can alternatively be so designed that the outer parts (rollers, discs, balls etc.) which are rotatably mounted on the pins have ball bearings between their contacting surfaces and/or between them and the surface of the pin.

While in the above described embodiments the drivers each consist of a pin and several outer parts moving independently of one another and made of rigid material, it is also possible to produce the drivers in one piece from resilient material or comprising one central pin of rigid material on which are mounted outer parts made of resilient material.

The method of operation of the universal shaft coupling according to the invention will now be described more in detail with reference to Figures 1 and 2.

When the two coupled shafts are axially aligned the joint parts are in the position shown in Figure 1. The axes of all the drivers are then in a plane passing through the centre M of the entire system and perpendicular to the axes of the shafts. Now, if one of the two shafts, for example, that carrying the spherical head, is caused to rotate clockwise, one of the side walls of the slot in the spherical head will exert pressure upon the innermost roller of each driver, which pressure is transmitted through the driver pin to the outermost roller, which latter in turn transmits the pressure to one of the side walls of the slot in the ball socket in order in this way to impart rotary motion to the second shaft.

Now, if at the same time the two shafts rotating together are swivelled around the centre M of the joint (it being assumed for the purposes of this example that during this displacement the axes of the two shafts remain in the plane of the drawing, the right-hand shaft moving downwardly), the drivers will be positively driven by the controlling member which is in movable engagement both with the ends of the two shafts as well as with the member for guiding the drivers, so that the axes of the said drivers will remain constantly in the same plane, this plane moving through an angle amounting to half of the angle enclosed by the two shafts. Thus the upper driver lying in the plane of the drawing moves with its axis to the right and the lower driver to the left. The axes of the remaining drivers which are outside the plane of the drawing and at an angle thereto, move in the corresponding direction but to a lesser extent, while the drivers lying perpendicularly to the plane of the drawing or in a horizontal axial plane, do not carry out any angular movement at all. The inner and outer rollers mounted on the drivers rotate in opposite directions upon the side walls of their respective slots, and to differing extents upon the driver pin, because the mean arc to be traversed by the inner roller is smaller than that of the outer roller.

If the displacement of the shafts is carried out not only in the plane of the drawing but in all planes in space, the plane which passes through the centre of the guide member and through all the driver axes carries out a gyratory movement.

The diagram in Figure 12 is given for the purpose of explaining the conditions which must be adhered to as regards dimensions in designing the controlling member for the driver guiding member in order that the plane passing through the driver axes shall always move by the amount of half of the relative swivelling angle of the two coupled shafts.

In this diagram the point marked A represents the centre of the ball 14 of the controlling member 13 which is slideably and rotatably mounted in the shaft 2, and the point B the centre of the spherical end 12 of the controlling member 13 which is mounted slideably and rotatably in the shaft 1. C is the centre of the spherical end 10 of the extension 9 on the guide member 6, which is rotatably mounted in the controlling member, and M is the centre of the guide member and of the entire system. The ratio of the distance $a$ between the points M and C to the distance $b$ between the points A and C can be determined with due consideration of constructional requirements. The distance between the points C and B can then be determined on the basis of the following equations:

(1) $$x = a \cdot \frac{\sin \beta}{\sin (2\beta + \gamma)}$$

(2) $$\sin \gamma = \frac{a}{b} \sin \beta$$

Taking for example $$a = \frac{2}{3} b$$

the value of $x$ for the following angles of displacement will be found from the above equations to be as follows:

$\alpha = 2°$    $x = .38a$
$\alpha = 20°$    $x = .40a$
$\alpha = 40°$    $x = .43a$ Taking $a = b$, the distance $x$ is determined from the equation:

(3) $$x = a \cdot \frac{\sin \beta}{\sin 3\beta}$$

In this case where the angle of displacement:

$\alpha = 2°$    $x = .34a$
$\alpha = 20°$    $x = .35a$
$\alpha = 40°$    $x = .40a$ The above examples of calculations prove that no fully constant value is obtained for the distance $x$. As however, in practice, the distance $x$ can be given only a definite value, such mean value will be chosen for it, according to the maximum angle of displacement $\alpha$ required, that the angle of error by which the plane passing through the driver axes will deviate from the theoretical positions $$\left(\beta = \frac{\alpha}{2}\right)$$

becomes one of minimum value. In practice it is possible to maintain the angle of error of less than 2° in the case of angles of displacement of up to 40°, so that no appreciable difference in the number of revolutions of the two coupled shafts occur. Such a small angle of error is still less noticeable, if it be considered that the entire joint system must possess certain freedom or latitude.

What we claim is:

1. In a joint for the connection of two shafts the combination of a spherical head on one shaft and a bowl-shaped ball socket on the other shaft, the head and the ball socket being provided with slots, a guide member arranged within a recess of the spherical head and carrying drivers extending through the said slots in the spherical head and in the ball socket and being held substantially in a common plane, the said guide member being formed on its free side with a pin-shaped extension perpendicular to the plane of the drivers, and being provided with a spherical end, a spring-loaded controlling member for controlling the position of the said guide member, said spring-loaded controlling member having an axial bore in its funnel-shaped hollow end adjacent to the guide member for receiving the said spherical end of the guide member.

2. A joint for connecting two shafts according to claim 1, wherein the funnel-shaped hollow end of the spring-loaded controlling member is provided on its surface with a spherical surface portion adapted to engage a cylindrical recess of the spherical head.

3. A joint for connecting two shafts according to claim 1, wherein the guide member is formed with a bearing surface concentrically arranged with respect to the centre of the joint system.

4. A joint for connecting two shafts according to claim 1, wherein the guide member is present substantially in the form of a hemi-spherical body adapted to bear on the spherical end wall of the recess of the spherical head of one of the shafts.

5. A joint for connecting two shafts according to claim 1, including an extension projecting from the bottom of the recess in the spherical head of the one of the shafts, a spherical head upon said extension and wherein the guide member has the form of a swash plate with a central bearing surface portion adapted to engage the spherical head of said extension.

6. In a joint for the connection of two shafts the combination of a spherical head on one shaft and a bowl-shaped ball socket on the other shaft, the head and the ball socket being provided with slots, a guide member arranged within a recess of the spherical head and carrying drivers extending through the said slots in the spherical head and in the ball socket and being held substantially in a common plane, the said guide member being formed in the shape of a swash plate with a pin-shaped extension perpendicular to the plane of the drivers on its free side, and being provided with a central bearing surface to engage the spherical end of a projection formed on the end wall of the recess of the spherical head, a spring-loaded member for controlling the position of the said guide member, said spring-loaded member having an axial bore in its funnel-shaped hollow end adjacent to the guide member for receiving the said spherical end of the guide member.

7. In a universal joint for the connection of two shafts the combination of a spherical head on one shaft and a bowl-shaped ball socket member on the other shaft, the said head being provided in its interior with a ball-shaped socket bearing, the head and the ball socket member being provided with slots, a driving member extending through the slots in the head and the ball socket member, the central portion of the said driving member being of spherical form and adapted to rotate in all directions within the said ball-shaped socket bearing, and a controlling member adapted to cooperate with both shafts.

8. In a universal joint for the connection of two shafts the combination of a spherical head on one shaft and a bowl-shaped ball socket member on the other shaft, the said head being provided in its interior with a ball-shaped socket bearing, the head and the ball socket member being provided with slots, an exterior housing ring adapted to encase the said ball socket member, a driving member passing through the slots in the head and the ball socket member and carrying rollers, the central portion of the said driving member being of spherical form and provided with at least one additional driver, a controlling member comprising a rod located on one side of the plane of symmetry of the joint and having two spherical ends, one of which is rotatably and slidably mounted in a cylindrical opening in the ball socket and subjected to the action of a spring, the other end engaging the spherical head and formed with a flared recess, in the inner end of which the spherical end of a pivot is rotatably mounted, said pivot being rigidly connected to the central portion of one of the drivers.

HANS HANFT.
ALBERT GEISZLER.